Jan. 22, 1963

L. E. SHAW 3,074,605

PIPE WRAPPING DEVICE

Filed Nov. 7, 1960

INVENTOR
LESLIE SHAW

BY: Fetherstonhaugh & Co
ATTORNEYS

United States Patent Office 3,074,605
Patented Jan. 22, 1963

3,074,605
PIPE WRAPPING DEVICE
Leslie Earl Shaw, Bethridge Road, Toronto,
Ontario, Canada
Filed Nov. 7, 1960, Ser. No. 67,721
5 Claims. (Cl. 225—100)

This invention relates to apparatus for and to a method of assisting in the coating and wrapping of pipe lengths.

It is an object of the invention to provide means and method for assisting in the coating and wrapping pipes in the type of pipe handling wherein the coating and wrapping apparatus is stationary while the pipe is rotated and translated in relation thereto.

It is an object of the invention to provide such means and method together with means for translating pipes continually beneath said coating and wrapping apparatus, means for feeding pipe lengths substantially perpendicularly to said translation direction, translating said lengths under said coating and wrapping apparatus, and means for removing coating and wrapped pipe lengths in a direction perpendicular to the translation direction.

It is an object of this invention to provide a plurality of aligned pairs of parallel wheels, each adapted to assume a skew orientation in relation to said pipe, and each pair of wheels being adapted to support the pipe on the adjacent portions thereof which slope downward toward one another, whereby rotation of the rollers simultaneously rotates and translates said pipes.

It is an object of this invention to provide means whereby pipes supplied in longitudinally spaced relation may be brought into abutting longitudinal relation for coating and wrapping and thereafter moved into spaced longitudinal relation for removal.

It is an object of this invention to provide means for simultaneously translating and rotating a pipe below a falling curtain of pitch or other coating material, wherein the pitch supply means is so arranged and oriented to provide that the plane of the curtain is transverse to the motion of points on the upper surface of the pipes being simultaneously rotated and translated.

In drawings which illustrate embodiments of the invention:

The invention is used with a method of coating and wrapping pipes wherein the coating and wrapping means is stationary and the pipe lengths are rotated and translated past it in a continuously moving line.

Because the wrapping is a continuous length of strip material applied in turn to the lengths of pipe as they pass, it will be seen that the pipe lengths must longitudinally abut as they are coated and wrapped.

Figure 3:
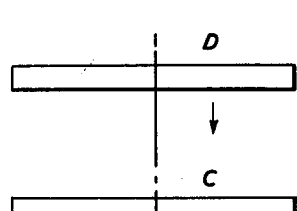
FIGURES 3, 4 and 5 are sequential schematic views showing the movement of the pipes during the operation of the invention.
Figure 3:
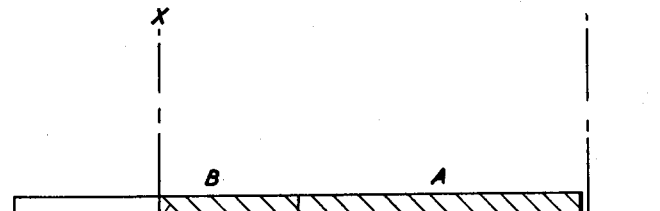

The pipe lengths are transversely supplied from a stack to the conveyance means which moves them longitudinally to the coating and wrapping means. Because of the method of stacking pipe lengths transverse supply is necessary. Transverse supply to a conveyor moving the lengths longitudinally means that the pipe lengths when placed on the conveyors will be spaced rather than abutting (see pipes B and C, FIGURE 3).

Figure 4:
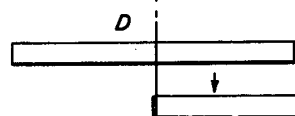
Figure 4:

The following pipe length C approaching the coating and wrapping apparatus (axis X—X) must therefore be moved by the conveyor faster than length B, so that by the time the trailing end of length B passes beneath the wrapping means, the leading end of length C is in abutment therewith (FIGURE 4).

The pipe lengths are transversely removed from the conveyor which moves them longitudinally after they are coated and wrapped. Such transverse movement of the pipe lengths is necessary to allow the coated and wrapped lengths to be stacked and piled. To avoid interference between the pipe being removed and the pipe following it is necessary that the two pipe lengths be spaced rather than abutting at the time of the removal of the leading pipe (that is, pipe A as shown in FIGURE 4).

In FIGURE 4 it will be seen that the leading pipe A which as left the coating and wrapping apparatus must therefore be moved faster longitudinally than the trailing pipe B so that although the trailing end of pipe A abuts the leading end of pipe B, at the time these ends pass under the coating and wrapping apparatus (FIGURE 3) these ends are spaced when the pipe A reaches a point for transverse removal (FIGURE 4).

Figure 5:
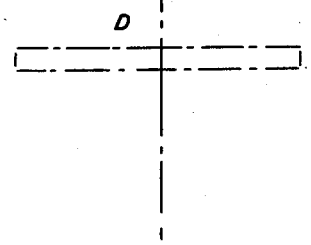
Figure 5:
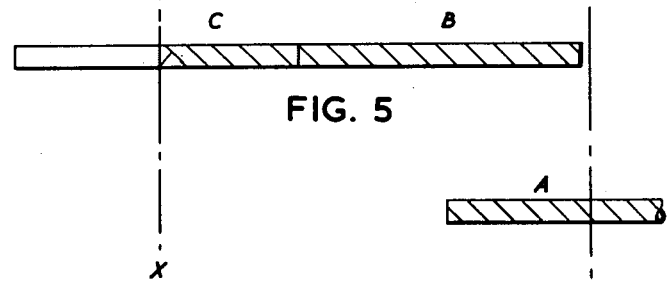
Figure 6:
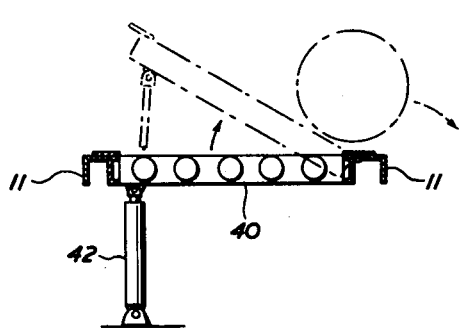
FIGURE 6 is a view illustrating transverse ejection of a wrapped pipe from an ejection platform.

FIGURE 5 shows the next sequence of pipe positions following FIGURE 4.

The conveyor in accord with the invention comprises a series of pairs of wheels, the pairs being aligned in the direction of desired longitudinal movement (FIGURE 1), while the wheels in a pair are skew to said direction. Each pair of wheels is mounted on spaced parallel shafts making a skew angle with the desired direction of longitudinal movement and are spaced so as to contact the pipe on opposite sides of the lower part of the surface whereby a plurality of pairs of said rollers, properly aligned, will support the pipe.

It will be seen that rotation of the rollers will cause the pipe to both translate and rotate.

Figure 1:
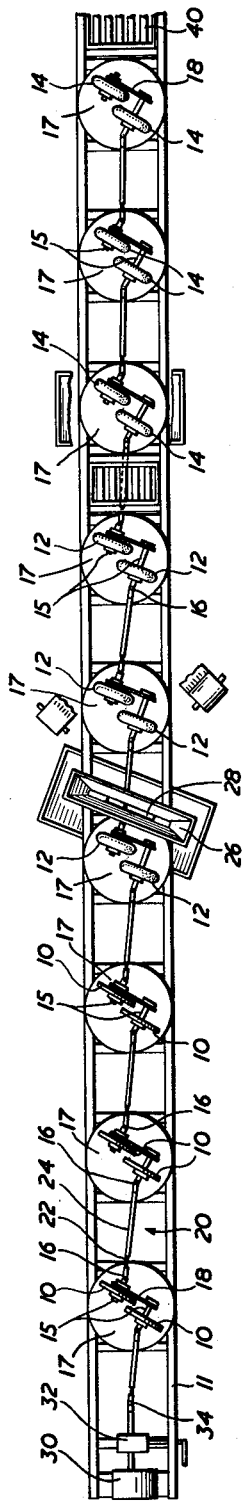
FIGURE 1 is a top view of pipe coating and wrapping means in accordance with the invention.

In FIGURE 1 is shown a group of three pairs of wheels 10, three pairs of wheels 12 and three pairs of wheels 14. Each pair of wheels is mounted on parallel shafts 15 on a common turntable 16 and the common shafts are arranged in driving relationship by a connecting chain 18. The turntables 17 are mounted on a frame 11 running the length of the conveyor. The rotary drive between adjacent pairs of wheels and thus between adjacent turntables comprise a composite shaft 20 connecting at one end to one of the shafts 15 associated with one turntable and at the other end with a shaft 15 associated with the next turntable in the conveyors. Shaft 20 is connected to each shaft 15 through a universally flexible driving connection 16 of any conventional design. The shaft 20 must be extendible and contractible which in this embodiment is achieved by providing a short length 22 of square cross section attached to each connection 16 and providing a complementary square bored sleeve 24 adapted to receive the short lengths 22 and with them to provide an extendible shaft.

In FIGURE 1 is shown the drive means which is located on the conveyor line. A motor 30 drives through a suitable adjustable gear box and reducer 32 and flexible coupling 34.

The group of wheels comprised of pairs 10 is adapted to receive pipe lengths fed in a direction perpendicularly to the direction of longitudinal movement.

The group comprised of pairs 10 is adapted to pass pipe lengths thereon onto the group comprised of pairs 12 where the pipe coating and wrapping apparatus is located which, in turn, pass the pipe lengths along the group of wheels comprised of pairs 14 where the transverse removal means takes the pipe from the conveyor.

A turntable 17 supports associated pairs of rollers, as already stated. Means are provided for ensuring that the three turntables 17 hold the three pairs of shaft 15 associated with wheel group comprised of pairs 10, parallel, and that these three turntables may be turned together to alter the orientation of the shafts with composite shafts 20 altering in length as required. Inherently, such turntable adjustment alters the longitudinal speed of a pipe passing over the wheel group.

Similar control of the turntables by adjusting the orientation of the shafts 15 in wheel group comprised of pairs 12 and for the shafts 15 in group comprised of pairs 14 and, hence, the pipe speeds thereover is provided but the controls for the three groups are preferably made independently orientable to provide different driving speeds for the pipes when passing over the three groups of wheels.

As previously explained the pipes are successively fed transversely onto the pair of wheels comprised of pairs 10, the rollers are simultaneously rotating the pipes and translating them onto a group comprised of pairs of wheels 12. In order to avoid interference between successive pipes that are fed onto the group comprised of pairs 10, it is necessary that a space be allowed between the trailing end of a preceding pipe and the leading end of the succeeding pipe.

This gap must be closed before the pipes reach the coating and wrapping apparatus associated with groups comprised of pairs 12.

Thus the wheels of group comprised of pairs 10 are oriented so that the axes of shafts 15 are more nearly perpendicular to the pipe axis than the axes of the shafts of group comprised of pairs 12. Thus, although all the wheels are driven by a common drive, the ratio of translation to rotation supplied by the wheels of group comprised of pairs 10 is higher than that supplied by the wheels of group comprised of pairs 12.

The ratios are adjusted so that the pipe lengths are abutting just before the abutting ends pass beneath the tarring and wrapping means.

In view of the difference in translatory speeds applied by the two groups of rollers, it is necessary that slippage take place between a length of pipe and one of the two groups of wheels when it is bridging them. This is accomplished in the preferred embodiment by providing that the wheels of group comprised of pairs 10 shall have metal surfaces as opposed to the balloon tyre wheels of group comprised of pairs 12. Thus a pipe length resting on a pair of wheels comprised of pairs 10 and a pair of wheels comprised of pairs 12 has slippage between the pipe length and the wheels of group comprised of pairs 10. It is desirable that no slippage takes place between the wheels of group comprised of pairs 12 and the pipe lengths since the motion of the pipe when wholly supported by wheels of group comprised of pairs 12 may be designed to cooperate with the coating and wrapping apparatus and the coating and wrapping may be evenly performed.

Coating means of conventional design schematically shown at 25 are provided including the hopper shaped tank kept filled with the suitable liquid coating material such as hot tar or enamel from a source (not shown) and terminating at its lower end in a feed slot 28. The feed slot is adapted to drop a curtain of pitch over the pipe length rotating and translating beneath it and is oriented to be perpendicular to the direction of (helical) travel of points on the upper surface of the pipe length. The orientation of the slot 28 is made adjustable to correspond to various helical pipe surface velocities.

The width of slot 28 is of course sufficient that the pipe passing beneath is completely coated.

Adjacent the coating means but in the direction of conveyor travel therefrom are located a pair of wrapping material reels 30. The reel mountings 32 are stationary and the shafts are oriented and located to feed overlapping strip widths onto the helically moving pipe surface in known fashion.

Coated and wrapped pipes move from the wheels of group comprised of pairs 12 to the wheels of group comprised of pairs 14 at which stage they are to be transversely ejected from the conveyor. In order that no interference shall take place between successives pipes it is necessary that there be a gap between adjacent edges of successive pipes. This is achieved by orienting the wheels of group comprised of pairs 14 so that they translate the pipe lengths faster than the wheels of group comprised of pairs 12.

It is necessary that slippage occur between the pipe lengths and the wheels of group comprised of pairs 14 during the time that the pipe is bridging wheel groups comprised of pairs 12 and comprised of pairs 14. As before, for proper coating and wrapping, the slippage should be in relation to wheels comprised of pairs 14 rather than wheels comprised of pairs 12.

The wheels of group comprised of pairs 14 are preferably balloon tyred and slippage is therefore preferably provided for by a water spray 38 issuing from a tank 35 located over the rearward pair of wheels in group 14. The water spray also cools the freshly applied coating and wrapping materials of the pipe.

Figure 2:
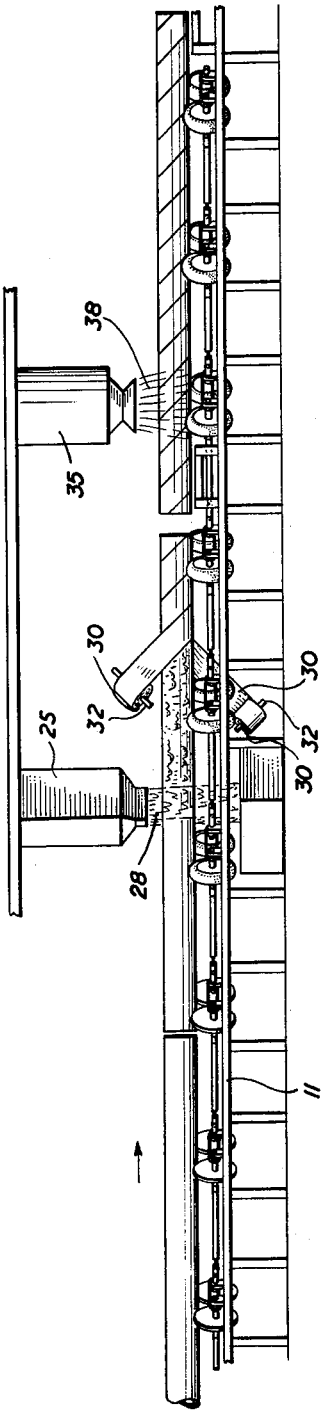
FIGURE 2 is a side view of the device shown in FIGURE 1.

The difference in speed of rotation and translation between pipes resting on the wheels of group comprised of pairs 12 and pipes resting on the wheels of group comprised of pairs 14 acts to separate adjacent pipes between these two wheel groups as shown in FIGURE 2 and sever the wrapping material by breaking.

The wheels comprised of pairs 12 and comprised of pairs 14 are preferably balloon tyres so that they will not mar the wrapped surface. To further decrease any chance of marring the wrapped surface the pressure in tyred wheels comprised of pairs 12 and comprised of pairs 14 is kept low to increase the area of contact between tyre and pipe.

The means of transverse ejection of the pipe from the group of wheels comprised of pairs 14 comprises an ejection platform 40 located at one side of the conveyor path and pivoted to the frame on an axis parallel to the direction of conveyor travel and being adapted to pivot upwardly about said pivot axis to lift a pipe off said travel path and roll it transversely to a stacking area (not shown). The lifting power for platform 40 may be of any desired form such as a hydraulic cylinder 42. Means are provided (not shown) for actuating the platform when a pipe length has reached the desired position to be ejected from the conveyor. This may be a limit switch of any desired form, designed to operate when triggered by the length end to actuate cylinder 42 to cause platform 40 to tip the length off the conveyor. Means are also provided for returning the platform 40 to its rest position below the conveyor before the next length passes.

What I claim as my invention is:

1. In a pipe wrapping machine, means for receiving lengths of pipe to be wrapped, conveying the said lengths to a coating station, and then beyond said coating station comprising a plurality of aligned pairs of rotatably mounted pipe supporting wheels, the said pairs being aligned to define a linear path for pipe that extends to and beyond the said wrapping station, the wheels of each of said pairs being adapted to cradle the lower half of a pipe therebetween as it travels said linear path, means for driving said wheels, said wheels having their axes oriented at an acute angle with respect to said linear path whereby each pair of wheels will give a pipe cradled therebetween simultaneous rotation and translation in the same sense as the others when driven by said drive means, said plurality of pairs of wheels being divided into an initial group, a middle group and a final group, each of said three groups having at least two pairs, said initial group being adapted to receive pipe lengths to be wrapped, said middle group being adapted to transport pipe lengths past said wrapping station and said final group being adapted to receive pipe lengths after wrapping, said initial group being operatively connected to said drive means to give pipe cradled therebetween relatively faster translation than said middle group, said final group being operatively connected to said drive means to give pipe cradled therebetween relatively faster translation than said middle group, the coefficient of friction between said initial group and pipe being less than the coefficient of friction between said middle group and pipe whereby slippage on a pipe supported by both said initial and middle groups takes place at said initial group.

2. Pipe coating and wrapping machine as claimed in claim 1 in which the coefficient of friction between said final group and pipe is less than the coefficient of friction of said middle group and pipe as a result of the faster translation imparted by said final group whereby slippage takes place between said final group and pipe when pipe is supported by both said final and middle groups.

3. A pipe coating and wrapping machine as claimed in claim 2 in which said wheels of said middle group and in said final group are balloon tires, a water head mounted to spray water on at least the leading pairs of wheels of said final group, the coefficient of friction of said wheels and pipe in said final group being less than the coefficient of friction between the wheels of said middle group and pipe as aforesaid by the application of water to the wheels of said final group by application of water thereto from said water head.

4. A pipe coating and wrapping machine as claimed in claim 2 in which the axes of rotation of said wheels all make acute angles with said linear path, the axes of rotation of said first group being more nearly perpendicular to said linear path than the axes of rotation of wheels in said second group, the axes of rotation of wheels in said final group being more nearly perpendicular to said linear path than the axes of rotation in the said middle group.

5. A pipe coating and wrapping machine as claimed in claim 2 in which said drive means includes a motor means for interconnecting the wheels in each of said pairs, and an extensible drive shaft connecting adjacent pairs, said extensible shaft having universal connecting means for connection with the said pairs of wheels adjacent each of its ends.

References Cited in the file of this patent

UNITED STATES PATENTS

| | | |
|---|---|---|
| 2,070,925 | Rolfs et al. | Feb. 16, 1937 |
| 2,074,892 | Derry | Mar. 23, 1937 |
| 2,112,865 | Putnam | Apr. 5, 1938 |
| 2,130,586 | Huston | Sept. 20, 1938 |
| 2,166,609 | Putnam | July 18, 1939 |
| 2,174,754 | Miller | Oct. 3, 1939 |
| 2,626,717 | Kraner | Jan. 27, 1953 |
| 2,770,284 | Myrick | Nov. 13, 1956 |
| 2,957,574 | Compton | Oct. 25, 1960 |